May 19, 1942.  E. G. BOICE  2,283,312

ROCK BIT

Filed March 6, 1941

Elvin G. Boice
INVENTOR.

BY

ATTORNEYS

Patented May 19, 1942

2,283,312

UNITED STATES PATENT OFFICE 2,283,312

ROCK BIT

Elvin G. Boice, Houston, Tex., assignor to Reed Roller Bit Company, Houston, Tex., a corporation of Texas Application March 6, 1941, Serial No. 382,012

3 Claims. (Cl. 308—174)

This invention relates to bearings for rock bit cutters and has for its general object the provision of an improved bearing structure for a side cutter bearing of a rock bit.

A more specific object of this invention is to provide a side cutter bearing for a rock bit which may be constructed with a minimum amount of precision work.

Another object of this invention is to provide a structure of the type referred to which will employ a minimum of individual parts and yet provide the maximum support for a roller cutter for the purpose of taking both the radial and thrust loads.

Another object of this invention is to provide a bearing structure for the purpose stated, which may be readily assembled.

Other objects and advantages of this invention will become apparent from the following description taken in connection with the accompanying drawing, wherein is set forth one embodiment of this invention.

Figure 1:
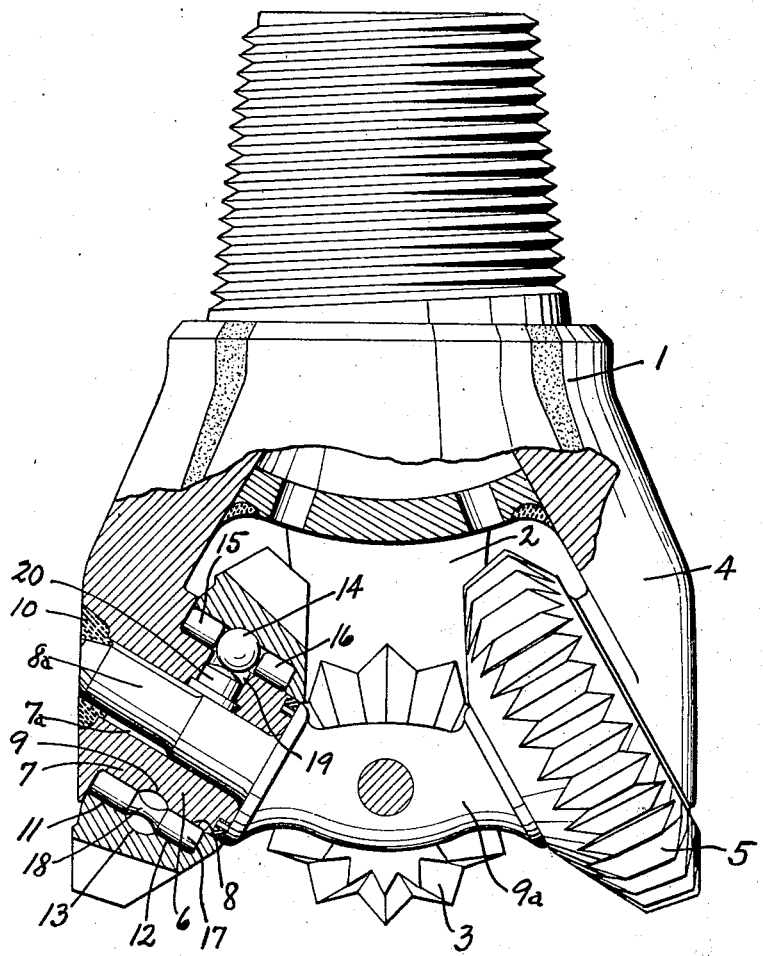
Fig. 1 is a side elevation of a cross roller bit having a side cutter bearing constructed in accordance with this invention, a portion of the bit and one side cutter being broken away and shown in vertical cross section for purposes of illustration.

In the drawing, the numeral 1 designates the bit head, which is provided with downwardly projecting bearing supports or legs 2 for supporting the cross roller cutters 3, and downwardly projecting bearing support or legs 4 for supporting the side roller cutters 5. For purposes of assembling, the bit head may be made in a plurality of parts divided longitudinally and joined together to provide the complete bit head, such joining being effected by means of welding or other suitable securing means.

Each of the side cutter legs 4 has an integral downwardly and inwardly extending bearing projection 6, such projection having formed on its outer surface an outer roller race 7, an inner roller race 8, and an intermediate ball race 9. The roller races, it will be noted, are of the same diameter. The bearing projection 6 is provided with a bore 7a extending throughout its length and adapted to receive a pin 8a on the end of a bridge 9a which extends between the side cutter bearings when the bit is assembled. The ends of the pins 8a are secured within the side cutter bearing supports by means of welding 10.

Surrounding each of the side cutter bearing projections 6 is one of the side cutters 5, and these side cutters, like bearing projections 6, are provided with outer and inner roller races 11 and 12 respectively and with an intermediate ball race 13.

The races are so proportioned that the ball races are intended to receive balls of larger diameter than the rollers, which are adapted to be received by the roller races. The ball races, however, are arranged so that the centers of the balls 14, which operate therein, will be the same distance from the axis of the corresponding bearing projection 6 as will the axes of the rollers 15, 16 and 17, which cooperate with the roller bearing races.

Figure 2:
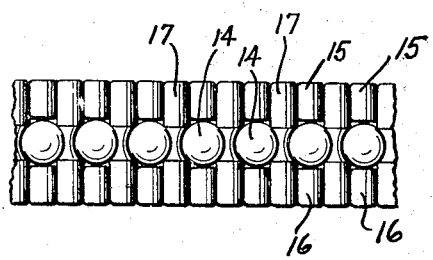
Fig. 2 is a projected view of a section of the assembled anti-friction members forming a part of the bearing shown in Fig. 1.

It will be seen in the drawing that each of the outer rollers 15 and the inner rollers 16 are of such a length that one such roller will fit in a space on either side of each of the balls 14. The rollers 17, however, extend the entire distance from the outer edge of the outer roller race to the inner edge of the inner roller race and extend between adjacent balls 14. In order that they might extend between such balls, these rollers 17 are cut away, as shown at 18, along a zone between the outer and inner roller races. It will readily be seen by reference to Fig. 2 also that the bearing portions of the rollers 17 will each be longer than either of the rollers 15 or 16, so that the rollers 17 will each furnish a somewhat greater bearing surface at each end than will one of the rollers 15 or 16.

It will be seen from the foregoing that a bearing has been provided in which the maximum amount of radial bearing is provided adjacent the opposite ends of the cutter with the minimum number of anti-friction bearing parts. This will prevent the cutter from becoming cocked inwardly or outwardly during its operation, and the provision of the thrust bearing balls adjacent the center plane of the cutter will serve to take the end thrust upon the cutter.

In assembling the bit just described, it will be apparent that the side cutters will first be mounted upon the bearing projections 6 with the rollers 15, 16 and 17 in place and that the balls 14 may then be inserted through the bore 7a and the passageway 19. The plug 20 will then be put in place and the segments providing the respective cutter supporting legs of the bit will be joined together as hereinabove mentioned. The pins 8a will then prevent the plugs 20 from dropping out and the bit will be ready for use.

Having described my invention, I claim:

1. A cutter bearing for a roller bit comprising a pair of roller bearings adjacent the opposite ends of a cutter respectively and a ball bearing between said roller bearings, the balls comprising said ball bearing being of greater diameter than the rollers comprising said roller bearings respectively, said roller bearings including relatively short rollers on each side of the ball bearing and other relatively long rollers extending between adjacent ones of said balls to provide bearing parts within both of said roller bearings.

2. In a cutter bearing for a roller bit, outer and inner roller bearings adjacent the outer and inner ends of the cutter respectively and a ball thrust bearing between said roller bearing, the balls comprising said ball thrust bearing being of larger diameter than the rollers comprising said roller bearings, said roller bearings consisting of a plurality of relatively short rollers, one extending outwardly from and another extending inwardly from each of said balls, and other relatively long rollers interposed between each of said relatively short rollers in the same bearing, said relatively long rollers extending between adjacent ones of said balls to provide bearings parts within both of said roller bearings.

3. A cutter bearing for a roller bit comprising a pair of roller bearings adjacent the opposite ends of a cutter respectively and a ball bearing between said roller bearings, the balls comprising said ball bearing being of greater diameter than the rollers comprising said roller bearings respectively, said roller bearings including a plurality of relatively long rollers extending between adjacent ones of said balls to provide bearing parts within both of said roller bearings.

ELVIN G. BOICE.